United States Patent
Ekambaram et al.

(10) Patent No.: US 10,169,202 B2
(45) Date of Patent: *Jan. 1, 2019

(54) CODE COMPONENT DEBUGGING IN AN APPLICATION PROGRAM

(71) Applicant: International Business Machines Corporation, Armonk, NY (US)

(72) Inventors: Vijay Ekambaram, Chennai (IN); Leigh A. Williamson, Georgetown, TX (US); Shinoj Zacharias, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/813,319

(22) Filed: Nov. 15, 2017

(65) Prior Publication Data

US 2018/0121318 A1    May 3, 2018

Related U.S. Application Data

(63) Continuation of application No. 15/338,306, filed on Oct. 28, 2016.

(51) Int. Cl.
*G06F 11/00* (2006.01)
*G06F 11/36* (2006.01)

(52) U.S. Cl.
CPC ........ *G06F 11/366* (2013.01); *G06F 11/3616* (2013.01); *G06F 11/3664* (2013.01); *G06F 11/3672* (2013.01); *G06F 11/3692* (2013.01)

(58) Field of Classification Search
CPC ................................................ G06F 11/366
See application file for complete search history.

(56) References Cited

U.S. PATENT DOCUMENTS

| | | | |
|---|---|---|---|
| 8,423,960 B2 | 4/2013 | Farchi et al. | |
| 8,799,773 B2 | 8/2014 | Reis et al. | |
| 8,918,882 B2 | 12/2014 | Bettini et al. | |
| 2008/0104577 A1* | 5/2008 | Holden | G06F 11/3692 717/126 |

(Continued)

OTHER PUBLICATIONS

IBM: List of IBM Patents or Patent Applications Treated As Related (Appendix P), Jan. 29, 2018, 2 pages.

(Continued)

*Primary Examiner* — Christopher S McCarthy
(74) *Attorney, Agent, or Firm* — L. Jeffrey Kelly

(57) ABSTRACT

Disclosed aspects relate to debugging a set of code components of an application program. A set of defect data which indicates a set of defects may be collected with respect to an application program. The set of defect data may be derived from a set of post-compilation users of the application program. A set of test case data which indicates a set of user interface features of the application program may be collected with respect to the application program. The set of test case data may be derived from a set of development tests of the application program. Using both the set of defect data and the set of test case data, a set of fragility data for the set of code components of the application program may be determined. Based on the set of fragility data, the set of code components of the application program may be debugged.

16 Claims, 9 Drawing Sheets

(56) References Cited

U.S. PATENT DOCUMENTS

| | | | | |
|---|---|---|---|---|
| 2013/0152050 | A1* | 6/2013 | Chang | G06F 11/0742 717/125 |
| 2013/0311968 | A1 | 11/2013 | Sharma et al. | |
| 2014/0109053 | A1* | 4/2014 | Vasudevan | G06F 11/3664 717/124 |
| 2014/0380277 | A1* | 12/2014 | Bhagavatula | G06F 11/3684 717/124 |
| 2015/0019564 | A1 | 1/2015 | Higginson et al. | |
| 2015/0100940 | A1 | 4/2015 | Mockus et al. | |
| 2015/0348294 | A1 | 12/2015 | Sridharan et al. | |
| 2017/0091071 | A1 | 3/2017 | Chitale et al. | |
| 2017/0192880 | A1* | 7/2017 | Ramakrishnan | G06F 11/3672 |
| 2018/0095859 | A1* | 4/2018 | Jayaraman | G06F 11/368 |

OTHER PUBLICATIONS

Pending U.S. Appl. No. 15/338,306, filed Oct. 28, 2016, entitled: "Code Component Debugging in an Application Program", 67 pages.

Pending U.S. Appl. No. 15/849,954, filed Dec. 21, 2017, entitled: "Code Component Debugging in an Application Program", 50 pages.

Mell, Peter, et al., The NIST Definition of Cloud Computing, National Institute of Standards and Technology, Oct. 7, 2009, Version 15, NIST, Gaithersburg, MD, US.

Ray, Mitrabinda, et al., "Prioritizing Program Elements: A Pretesting Effort to Improve Software Quality." Prioritizing Program Elements: A Pretesting Effort to Improve Software Quality. Hindawi Publishing Corporation, Oct. 27, 2011; <http://www.hindawi.com/journals/isrn/2012/598150/>.

Ray, Mitrabinda, et al., "Code-based Prioritization: A Pre-testing Effort to Minimize Post-release Failures"; <http://link.springer.com/article/10.1007%2Fs11334-012-0186-3>.

Moghaddam, Samaneh; "Beyond Sentiment Analysis: Mining Defects and Improvements from Customer Feedback"; 37th European Conference on IR Research, ECIR 2015, Vienna, Austria, Mar. 29-Apr. 2, 2015; <http://link.springer.com/chapter/10.1007/978-3-319-16354-3_44>.

Musa, J.D.; "Operational profiles in software-reliability engineering"; IEEE Software Magazine; <https://www.computer.org/csdl/mags/so/1993/02/s2014.pdf>.

Cobb, R.H., et al., "Engineering software under statistical quality control," IEEE Software, vol. 7, No. 6, pp. 45-54, 1990.

Adams, E.N., "Optimizing preventive service of software products," IBM Journal of Research and Development, vol. 28, No. 1, 1984; <http://ieeexplore.ieee.org/document/5390362/>.

Boehm, Barry, et al.; "Software Defect Reduction Top 10 List"; Computer, vol. 34, No. 1, pp. 135-137, 2001; <https://www.cs.umd.edu/projects/SoftEng/ESEG/papers/82.78.pdf>.

Boehm, Barry, et al., "Value-based Software Engineering: A Case Study." IEEE Software, Mar. 10, 2003; <http://www.csun.edu/~hbcsc521/documents/Value_Based_Case_Study.pdf>.

Li, Q., et al., "Bridge the gap between software test process and business value: a case study," in Proceedings of the International Conference on Software Process: Trustworthy Software Development Processes (ICSP '09), 2009; <http://citeseerx.ist.psu.edu/viewdoc/download?doi=10.1.1.365.9269&rep=rep1&type=pdf>.

Chen, N, et al., AR-Miner: Mining informative reviews for developers from mobile app marketplace. In Proceedings of the 36th International Conference on Software Engineering (ICSE), pp. 767{778, 2014}; <http://ink.library.smu.edu.sg/cgi/viewcontent.cgi?article=3323&context=sis_research>.

Vu, P., et al., Mining user opinions in mobile app reviews: A keyword-based approach. In CoRR, 2015; <https://arxiv.org/pdf/1505.04657.pdf>.

Fu, B., et al., Why people hate your app: Making sense of user feedback in a mobile app store. In Proceedings of ACM SIGKDD International Conference on Knowledge Discovery and Data Mining, pp. 1276{1284, 2013}; <http://www.cs.cmu.edu/~leili/pubs/fukdd2013wiscom.pdf>.

Gao, C., et al., "AR-Tracker: Track the Dynamics of Mobile Apps via User Review Mining"; <https://www.cse.cuhk.edu.hk/lyu/_media/conference/cygao_ivce2015.pdf>.

Gurusami, Karuppusai, et al., "A New Approach for Prioritization of Failure Modes in Design FMEA Using Anova." World Academy of Science, Engineering, and Technology, 2009; <http://waset.org/publications/6947/a-new-approach-for-prioritization-of-failure-modes-in-design-fmea-using-anova>.

Karambir, et al.; "Prioritize Test Case Survey for Component-Based Software Testing"; International Journal of Advanced Research in Computer Science and Software Engineering; vol. 3, Issue 6, Jun. 2013; <http://www.jarcsse.com/docs/papers/Volume_3/6_June2013/V3I6-0329.pdf>.

* cited by examiner

CODE COMPONENT DEBUGGING IN AN APPLICATION PROGRAM

BACKGROUND

This disclosure relates generally to computer systems and, more particularly, relates to debugging a set of code components in an application program. Application programs may be used to carry out a variety of functions. The complexity of code components in application programs is increasing. As the complexity of code components in application programs increases, the need for debugging of code components may also increase.

SUMMARY

Aspects of the disclosure relate to debugging a set of code components of an application program. The degree of fragility of code components may be determined based on defect data included in application-store reviews. Application-store reviews may be analyzed to mine information that indicates defects in an application program. Based on the defect data extracted from the application store reviews, a group of development tests may be identified. Using the group of development tests, defects mentioned in the application-store reviews may be mapped with one or more code components of an application program. A fragility score for the identified code components may be calculated based on the correlation between the defects, the correlation between the development tests, the defect criticality, cluster density, code complexity/inter-dependency, or other factors. An analytics-based component may periodically sync with the application-store review updates to compute updated fragility scores for the code components.

Disclosed aspects relate to debugging a set of code components of an application program. A set of defect data which indicates a set of defects may be collected with respect to an application program. The set of defect data may be derived from a set of post-compilation users of the application program. A set of test case data which indicates a set of user interface features of the application program may be collected with respect to the application program. The set of test case data may be derived from a set of development tests of the application program. Using both the set of defect data and the set of test case data, a set of fragility data for the set of code components of the application program may be determined. Based on the set of fragility data, the set of code components of the application program may be debugged.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
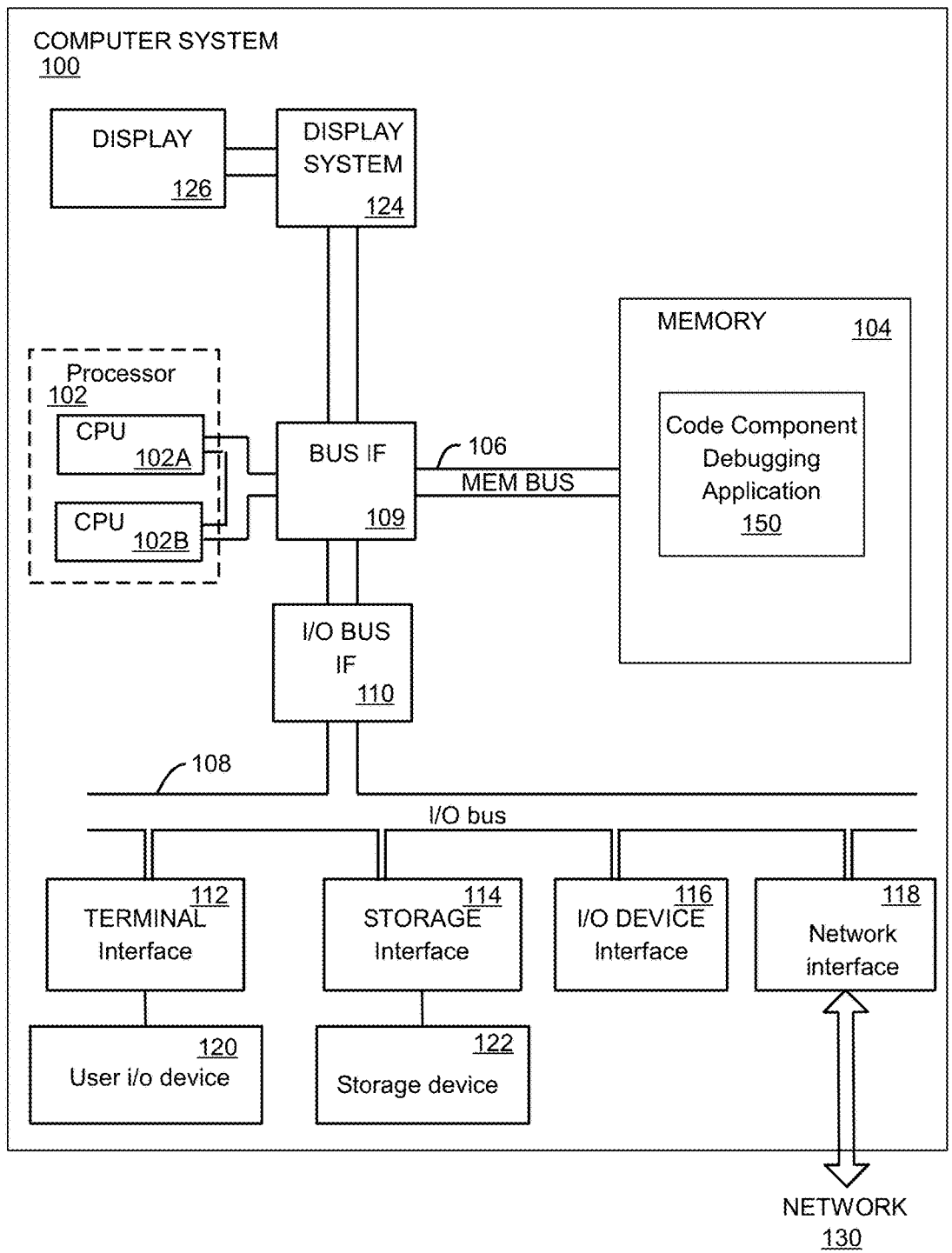
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to debugging a set of code components of an application program. The degree of fragility of code components may be determined based on defect data included in application-store reviews. Application-store reviews may be analyzed to mine information that indicates defects in an application program. Based on the defect data extracted from the application store reviews, a group of development tests (e.g., test cases) may be identified. Using the group of development tests, defects mentioned in the application-store reviews may be mapped with one or more code components of an application program. A fragility score for the identified code components may be calculated based on the correlation between the defects, the correlation between the development tests, the defect criticality, cluster density, code complexity/inter-dependency, or other factors. An analytics-based component may periodically sync with the application-store review updates to compute updated fragility scores for the code components. Leveraging application-store reviews for determining the degree of fragility of code components may be associated with defect identification, code debugging efficiency, and application program reliability.

Application-stores are one location where users may share data and information regarding defects, bugs, glitches, or other errors in application programs. Aspects of the disclosure relate to analyzing application-store reviews and mining defect information from them to identify defects in application programs. The defect information may include information regarding a description of the defect, the defect correlation, and the criticality of the defect. For instance, a user may post a review stating that "The login screen is not working," or "The app crashes whenever I click the 'submit' button." Aspects of the disclosure relate to collecting and analyzing a set of application-store reviews and mapping them to a set of test cases (e.g., development tests) performed on the application program during the development phase. For instance, top-k neighborhood algorithms may be used to retrieve top-k cases for each defect identified based on the application-store reviews, and one or more top-k test cases for each defect may be selected based on the semantic similarity in the widget text between defects and the test cases.

Based on the test cases and the application-store reviews, the test cases may be correlated with corresponding code components which are executed during test-case playback. Method and component runtime logs for each test case may be collected, and the code components may be mapped with the defects identified from the application-store reviews. Aspects of the disclosure relate to determining a score (e.g., fragility data) for each of the code components to indicate the degree of fragility of the each code component. The fragility data may be calculated based on one or more parameters including a correlation between the defects, a correlation between test-cases, a defect criticality, a cluster density and correlation for test cases, or a code complexity and inter-dependency based on data/control flow analysis. By sorting and classifying the fragility data for a set of code components, fragile code components may be detected and prioritized (e.g., for debugging). In some cases, when new reviews become available in the application store for a particular application program, the fragility data for the set of code components may be recomputed.

Aspects of the disclosure relate to a system, method, and computer program product for debugging a set of code components of an application program. A set of defect data which indicates a set of defects may be collected. The set of defect data may be derived from a set of post-compilation users of the application program. A set of test case data which indicates a set of user interface features of the application program may be collected. The set of test case data may be derived from a set of development tests of the application program. Using both the set of defect data and the set of test case data, a set of fragility data for the set of code components of the application program may be determined. In embodiments, the set of fragility data may indicate a set of fragility extents for the set of code components of the application program. In embodiments, the set of fragility data may indicate a set of fragility nature-types for the set of code components of the application program.

Aspects of the disclosure relate to debugging the set of code components of the application program based on the fragility data for the set of code components of the application program. In embodiments, debugging the set of code components may include establishing a breakpoint linked with the set of code components of the application program in an automated fashion based on the set of fragility data. In response to triggering the breakpoint, the set of code components of the application program linked with the breakpoint may be presented, and the set of code components of the application program may be modified. In embodiments, aspects of the disclosure relate to retrieving a set of updated defect data using a synchronization criterion, and using both the set of updated defect data and the set of test case data to determine a set of updated fragility data for the set of code components of the application program. The set of code components may be debugged based on the set of updated fragility data. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a code component debugging application 150. In embodiments, the code component debugging application 150 may include instructions or statements that execute on the processor 102 or instructions or statements that are interpreted by instructions or statements that execute on the processor 102 to carry out the functions as further described below. In certain embodiments, the code component debugging application 150 is implemented in hardware via semiconductor devices, chips, logical gates, circuits, circuit cards, and/or other physical hardware devices in lieu of, or in addition to, a processor-based system. In embodiments, the code component debugging application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
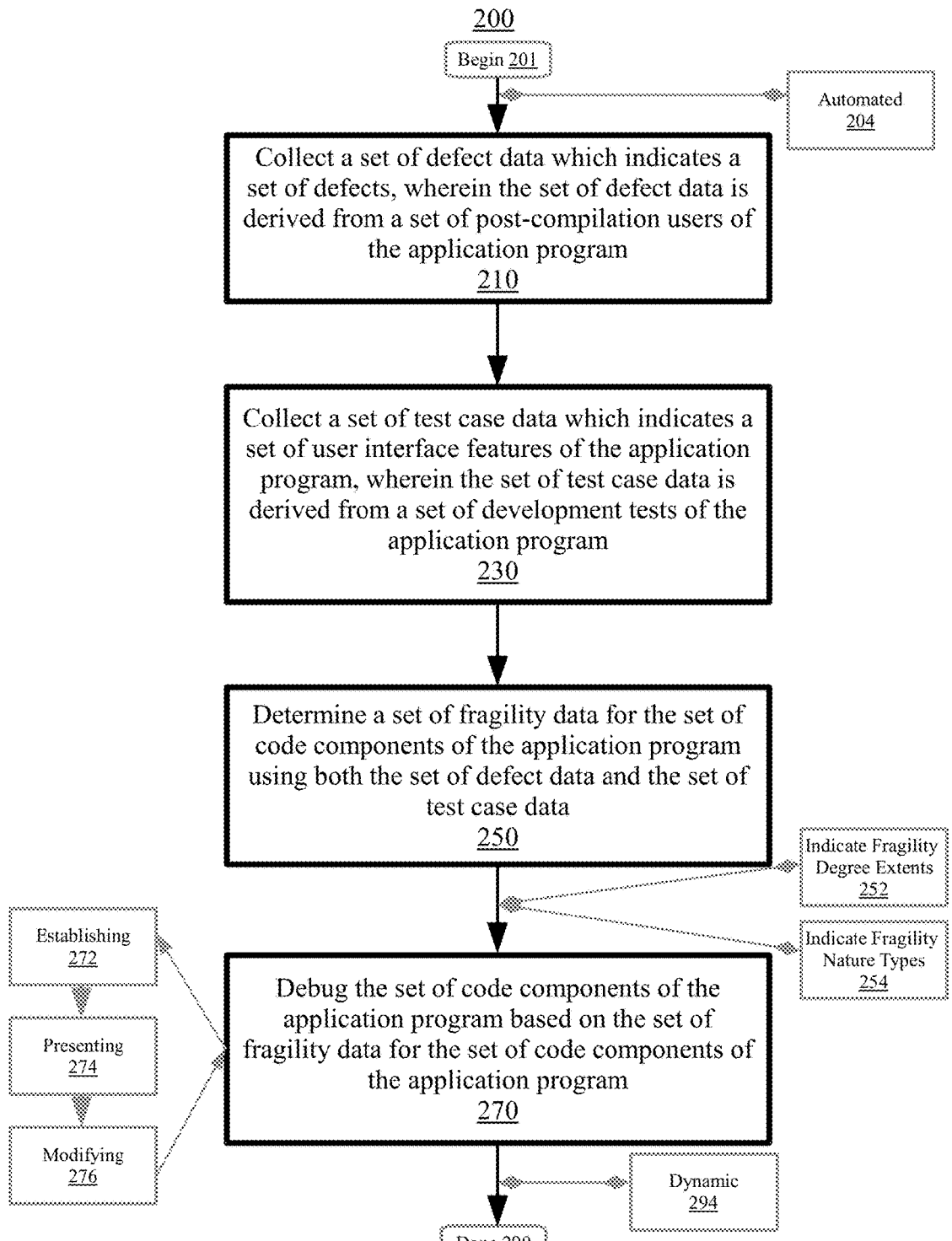
FIG. 2 is a flowchart illustrating a method for debugging a set of code components of an application program, according to embodiments.

FIG. 2 is a flowchart illustrating a method 200 for debugging a set of code components of an application program. Aspects of FIG. 2 relate to determining and debugging a set of code components based on defect data collected from application-store reviews for an application program. The application program may include a collection of programming code or other computing instructions for implementing a specific task or operation. For instance, the application program may include accounting software, billing management software, supply chain management software, enterprise asset management or resource planning software, database management software, or other types of computer programs. In embodiments, the application program may be distributed through an application store (e.g., online marketplace through which users can purchase and post reviews for application programs). Aspects of the disclosure relate to the recognition that, in embodiments, reviews posted for an application program on an application store may include information regarding defects or errors of the application program. Accordingly, aspects of the disclosure relate to mining data from application store reviews to identify fragile code components (e.g., portions of code associated with a high density of errors) and perform debugging operations. Leveraging application-store reviews for determining the degree of fragility of code components may be associated with defect identification, code debugging efficiency, and application program reliability. The method 200 may begin at block 201.

In embodiments, aspects of the disclosure relate to debugging a set of code components. Generally, the set of code components may include segments, blocks, lines, sections, chunks or other portions of programming code of an application program. In embodiments, the set of code components may include a group of consecutively located lines of code. For instance, a particular code component may include the programming code located between lines 37 and 84 of a source code document. In embodiments, the set of code components may include a set of computer instructions configured to provide a particular function or group of related functions (e.g., distributed segments of code may be related to implementation of the same function). As examples, the set of code components may include a group of distributed lines of code that relate to displaying a calculator function, enabling file upload (e.g., to a server), facilitating user login (e.g., to a service) or the like. In embodiments, the set of code components may include a group of modules (e.g., self-contained portions of code configured to execute a particular aspect of a feature or function). For instance, the set of code components may include a first module configured to handle a procedure for user authentication, and a second module configured for facilitating database access for the authenticated user. In certain embodiments, code components may include one or more classes (e.g., extensible program-code templates providing initial values for states or behaviors), methods (e.g., procedure associated with a data object), or features (e.g., functions or operations). Other types of code components are also possible.

In embodiments, the collecting of the set of defect data, the collecting of the set of test case data, the determining of the set of fragility data, and other steps described herein may each occur in an automated fashion without user intervention at block 204. In embodiments, the collecting of the set of defect data, the collecting of the set of test case data, the determining of the set of fragility data, and other steps described herein may be carried out by an internal code component debugging module maintained in a persistent storage device of a local computing device (e.g., computer or server connected to a local network). In certain embodiments, the collecting of the set of defect data, the collecting of the set of test case data, the determining of the set of fragility data, and other steps described herein may be carried out by an external code component debugging module hosted by a remote computing device or server (e.g., server accessible via a subscription, usage-based, or other service model). In this way, aspects of code component debugging may be performed using automated computing machinery without manual action. Other methods of performing the steps described herein are also possible.

At block 210, a set of defect data which indicates a set of defects may be collected with respect to the application program. The set of defect data may be derived from a set of post-compilation users of the application program. Generally, collecting can include gathering, aggregating, accumulating, or otherwise acquiring the set of defect data. Aspects of the disclosure relate to the recognition that, in embodiments, defects or errors of an application program may discovered after completion of the development process (e.g., by users of the application program). Accordingly, aspects of the disclosure relate to collecting a set of defect data and using it to facilitate debugging of the application program. In embodiments, collecting the set of defect data may include mining data from application-store reviews posted by users of the application program. For instance, a written review that describes a problem regarding a data submission interface of an application program may be extracted together with posted screenshots illustrating the nature of the defect. The set of defect data may include information that indicates errors, bugs, glitches, or other irregularities of the application program. For instance, the set of defect data may include textual data (e.g., written description of defects), image/video data (e.g., screenshots or other visual illustrations), rating data (e.g., assessments of the quality of the application program) and other types of information. In embodiments, the set of defect data may indicate particular defects (e.g., application freezes, login failures, time-outs) of the application program. In embodiments, the set of defect data may be derived from a set of post-compilation users (e.g., non-developer users). The set of post-compilation users may include individuals using the application program as a published product (e.g., as an alpha release, beta release, final version). As an example, collecting the set of defect data may include aggregating product reviews posted on an application distribution site by users who purchased the application program as customers. Other methods of collecting the set of defect data are also possible.

Consider the following example. An application program may include a mobile software app for checking train schedules in a metropolitan area. The application program may be distributed to users via a mobile application store. Users of the application may post reviews on the mobile application store describing their experiences with the application, as well as bugs or glitches they have encountered. For instance, a first user review may include a textual description that explains that the application miscalculates train fare for traveling from a first station to a second station, but displays the correct value when the origin station and the destination are reversed. The user review may also include screenshots that illustrate the miscalculated train fare. As described herein, collecting the set of defect data may include identifying the first user review (e.g., the textual description as well as the screenshot) together with other user reviews that relate to the application program, and extracting defect data from the set of reviews (e.g., using natural language processing or other content analysis techniques to identify the defects). Other methods of collecting the set of defect data are also possible.

At block 230, a set of test case data which indicates a set of user interface features of the application program may be collected. The set of test case data may be derived from a set of development tests of the application program. Generally, collecting can include gathering, aggregating, identifying, finding, selecting or otherwise acquiring the set of test case data. The set of test case data may include information regarding archived parameter configurations in which the application was tested during development. For instance, the set of test case data may specify which aspects (e.g., systems, code components, modules) of the application program were tested, how they were tested, the configuration of the testing environment, the outcome of the tests, written descriptions/comments explaining how and why the application was tested, and other types of data. The set of test case data may indicate a set of user interface features (e.g., data objects, interface elements, other aspects) of the application program. For instance, the set of test case data may reference a particular screen, page, button, image, or interface element of the application program. In embodiments, the set of test case data may be derived from a set of development tests of the application program. The set of development tests may include experiments, investigations, evaluations, or other analyses performed to assess one or more aspects of the application program during development (e.g., by developers of the application program prior to public release). In embodiments, collecting the set of test case data may include searching an archived test suite (e.g., organized series of tests used to evaluate the behavior of an application program) for one or more test cases that relate to a particular defect indicated by the set of defect data. For instance, a set of test case data relating to "login procedures" may be identified and collected from the test suite based on a set of defect data that indicates a problem with the login procedure of the application program. Other methods of collecting the set of test case data are also possible.

Consider the following example. A set of defect data may be collected which indicates a defect with respect to the "User Profile Data Submission" screen of an application program. For instance, the set of defect data may include a written description that explains how, after entering their information, a user presses the "Save" button, but the screen simply refreshes, deleting the received data without saving it in a profile for the user. Based on the set of defect data, a test suite for the application program may be searched for test cases that pertain to "User Profile Data Entry," "Data Submission Procedure," and other related test cases. In embodiments, the set of test cases may indicate how the code components configured to implement the "User Profile Data Submission" screen were tested during development. For instance, one test case may indicate that the code components were tested for first names up to 8 characters (e.g., first names exceeding 8 characters were not tested). As such, it may be determined that the "User Profile Data Submission" screen may encounter an error when names longer than 8 characters (e.g., Josephine, Alexander, Montgomery) are entered. Other methods of collecting a set of test case data are also possible.

At block 250, a set of fragility data may be determined for the set of code components of the application program. The set of fragility data may be determined using both the set of defect data and the set of test case data. Generally, determining can include computing, calculating, formulating, generating, or otherwise ascertaining the set of fragility data. The set of fragility data may include a quantitative or qualitative indication of the sensitivity, proclivity to malfunction, likelihood to behave irregularly, or error frequency of the set of code components. For instance, the set of fragility data may indicate that a particular code component has a high likelihood to malfunction in particular operating configurations, is easily affected by changes to other code components, or could impact a significant number of other code components if changed (e.g., code components considered to be "fragile" may be responsible for a relatively high proportion of defects in the program application). In embodiments, determining the set of fragility data may include generating an index that associates the number (e.g., total amount), frequency (e.g., number per given time), or criticality (e.g., severity) of defects (e.g., as indicated by the set of defect data) with different code components (e.g., as identified by set of test case data). The indexed results (e.g., code components and associated defect information) may be aggregated and arranged in a qualitative or quantitative fashion to indicate the relation between one or more code components of the set of components and the set of defects. In this way, the code components that are associated with a greater number of defects, a greater malfunction frequency, or defects of relatively greater severity may be identified, and the set of fragility data may be generated to characterize the relation between the set of defects and one or more corresponding code components. Other methods of determining the set of fragility data are also possible.

In embodiments, the set of fragility data may indicate a set of fragility degree-extents for the set of code components of the application program at block 252. A respective subset of the set of fragility data may indicate a respective fragility degree-extent for a respective code component of the set of code components of the application program. Generally, indicating can include signifying, representing, expressing, or otherwise conveying the set of fragility degree-extents. Aspects of the disclosure relate to the recognition that, in embodiments, different code components of the set of code components may have different degrees of fragility. Accordingly, aspects of the disclosure relate to determining a set of fragility data configured to indicate a set of fragility degree-extents for the set of code components. The set of fragility degree-extents may include a measure of how fragile (e.g., proclivity to cause defects/malfunctions with respect to itself or other code components) a particular code component is. In embodiments, indicating the set of fragility-degree extents may include labeling one or more code components with a qualitative expression of fragility. For instance, a first code component may be labeled with a tag of "highly fragile" and a second code component may be labeled with a tag of "somewhat fragile." In embodiments, indicating the set of fragility-degree extents may include assigning a quantitative score (e.g., fragility score) to express the fragility of a code component. As an example, a first code component may be assigned a score of 91 (e.g., indicating substantially high fragility) and a second code component may be assigned a score of 11 (e.g., indicating substantially low fragility). Other methods of indicating the set of fragility degree-extents are also possible.

In embodiments, the set of fragility data may indicate a set of fragility nature-types for the set of code components of the application program at block 254. A respective subset of the set of fragility data may indicate a respective fragility nature-type for a respective code component of the set of code components of the application program. Generally, indicating can include signifying, representing, expressing, or otherwise conveying the set of fragility nature-types. Aspects of the disclosure relate to the recognition that, in certain embodiments, different code components of the set of code components may be associated with different types of defects. Accordingly, aspects of the disclosure relate to determining a set of fragility data configured to indicate a set of fragility nature-types for the set of code components. The set of fragility nature-types may include characteristics, attributes, types, typologies, properties, or other aspects of the set of code components that describe the nature of the fragility (e.g., what about it is fragile). In embodiments, indicating the set of fragility-nature types may include annotating the set of code components (e.g., in an integrated development environment, source code document) with tags or markers that describe the fragility of the tagged code component. For instance, a first code component may be tagged with a written description that describes how "Updates freeze at 26%, then fails." As another example, a second code component may be tagged with a description that describes a "High frequency of defects as indicated by application-store reviews." Other methods of indicating the set of fragility-nature types for the set of code components are also possible.

At block 270, a set of code components of the application program may be debugged based on the set of fragility data for the set of code components of the application program. Generally, debugging can include adjusting, troubleshooting, repairing, fixing, revising, or otherwise removing errors from the set of code components. Aspects of the disclosure relate to the recognition that, in embodiments, the set of defect data and the set of test case data may be used to identify bugs (e.g., errors, malfunctions, defects, glitches) in the set of code components. Accordingly, aspects of the disclosure relate to making use of the set of fragility data to perform debug operations for the set of code components. In embodiments, debugging may include using the fragility data to identify a subset of code components associated with a fragility score above a fragility score threshold (e.g., a code component with a fragility score of 76 may exceed a fragility score threshold of 60), and initiating a code diagnostic tool to find and resolve defects of the identified code component. In embodiments, debugging may include comparing the set of fragility data with a set of debug criteria for the application program that specifies potential causes or suggested debugging procedures for the set of code components. For instance, for an application program associated with a defect of "Application crashes on start-up," a set of debug criteria may indicate that an "Application Initiation Memory Value" is set too low. In embodiments, debugging may include using a tracing technique to run a code component and log information regarding the execution of the code component to ascertain the origin of the defect, and subsequently examining program states (e.g., values of variables, call stacks) for the application program to discover and resolve the error. Other methods of debugging the set of code components based on the set of fragility data are also possible.

In embodiments, debugging the set of fragility data for the set of code components may include establishing a breakpoint linked with the set of code components of the application program at block 272. The breakpoint may be established in an automated fashion based on the set of fragility data. Generally, establishing can include instantiating, setting, creating, providing, or generating the breakpoint linked with the set of code components. The breakpoint may include an intentional stopping or pausing place in a program, configured to pause operation of the application program once triggered. For instance, the breakpoint may include a watchpoint (e.g., type of breakpoint configured to stop execution of an application when the value of a specified expression achieves a particular value). In embodiments, the breakpoint may be established based on the set of fragility data. For example, the set of fragility data (e.g., including the set of test cases) may be analyzed to ascertain one or more locations of a code component that may be associated with a bug or defect (e.g., a location that was the source of a defect during development tests), and the breakpoint may be established to isolate portions of the code component for testing. As described herein, establishing the breakpoint may be performed automatically. For instance, a code diagnostic tool may be configured to examine the set of fragility data, identify a potential origin location for a defect, and establish the breakpoint in association with the potential defect origin location within a code component. Other methods of establishing the breakpoint are also possible.

In embodiments, the set of code components of the application program linked with the breakpoint may be presented in response to triggering the breakpoint at block 274. Generally, presenting may include displaying, highlighting, marking, indicating, or otherwise providing the set of code components. Aspects of the disclosure relate to the recognition that triggering of a breakpoint (e.g., watchpoint) may indicate the presence of a defect or bug associated with the line or lines of code at which the watchpoint was triggered. Accordingly, in embodiments, aspects of the disclosure relate to presenting or displaying the code components associated with the watchpoint triggering in order to identify the source of application program errors. As an example, a watchpoint may include set of instructions that defines that a particular code component is to run from Line 118 to Line 146, one line at a time, unless one or more expressions return a value of "False" when executed. Accordingly, the code component may be initiated, and may proceed without error until Line 131, at which point a value of "False" is returned and the watchpoint is triggered. In response to triggering the watchpoint, Line 131 may be highlighted (e.g., in red or yellow) to indicate the potential presence of an error or defect. Other methods of presenting the set of code components linked to the breakpoint in response to triggering of the breakpoint are also possible.

In embodiments, the set of code components of the application program may be modified at block 276. Generally, modifying can include adjusting, altering, repairing, fixing, revising, or otherwise changing the set of code components. Aspects of the disclosure relate to the recognition that, in response to identifying one or more locations of a code component that are potentially associated with an error or defect, modifying the set of code components to remove or resolve the error may be associated with positive impacts to application program performance. In embodiments, modifying the set of code components may include altering the value of a variable or parameter, adding an additional expression or instruction, removing a portion of code, or performing another action with respect to the set of code components. As an example, modifying the set of code components may include rewriting the set of code components to remove a variable or line of code that may be the cause of a defect. Other methods of modifying the set of code components are also possible.

Consider the following example. An application program may include a mobile online banking application. A set of defect data including a set of application-store reviews for the online banking application may be collected. In embodiments, the set of defect data may include a first subset of 11 reviews that relate to a "Log-In Screen Failure," a second subset of 2 reviews that relate to an "Account Display Error," and a third subset of 24 reviews that relate to "Account Statement Print Failure." Based on the set of defect data, a set of test case data may be collected. In embodiments, the set of test case data may include a subset of test cases that correspond to each respective defect indicated by the set of defect data. Based on the set of defect data and the set of test case data, a set of fragility data for the set of code components may be determined. In embodiments, the number of user reviews and relative severity of each defect may be weighted in order to calculate a fragility degree-extent for a set of code components corresponding to the set of identified defects. For example, in certain embodiments, the "Log-In Screen Failure" defect may be assigned a fragility degree-extent of "98" (e.g., high number of reviews and high degree of relative severity), the "Account Display Error" may be assigned a fragility degree-extent of "44" (e.g., moderately high severity but few users impacted), and the "Account Statement Print Failure" may be assigned a fragility degree-extent of "62" (e.g., relatively low severity but higher number of impacted users). Based on the set of fragility data, the set of code components that correspond to the identified defects may be debugged. In embodiments, as described herein, the set of code components may be debugged in order from highest fragility degree-extent to lowest (e.g., code component associated with the "Account Display Error" is debugged first, followed by the "Account Statement Print Failure" second and the "Account Display Error third). Other methods of debugging the set of code components based on the set of fragility data determined from application-store user reviews are also possible.

In embodiments, the collecting of the set of defect data, the collecting of the set of test case data, the determining of the set of fragility data, and other steps described herein may each occur in a dynamic fashion to streamline debugging at block 294. For instance, the collecting of the set of defect data, the collecting of the set of test case data, the determining of the set of fragility data, and other steps described herein may occur in real-time, ongoing, or on-the-fly. As an example, one or more steps described herein may be performed in an ongoing fashion (e.g., defect data may be automatically collected in response to detection) in order to streamline (e.g., facilitate, promote, enhance) debugging of the set of code components.

Method 200 concludes at block 299. As described herein, aspects of method 200 relate to determining a degree of fragility of a set of code components based on defect data derived from application-store reviews. Aspects of method 200 may provide performance or efficiency benefits for application program reliability. As an example, defects and errors that are difficult to simulate in development testing environments may be discovered by users (e.g., in real-world contexts), detected based on user reviews, and resolved using debugging techniques to facilitate application program usability. Altogether, leveraging application-store reviews for determining the degree of fragility of code components may be associated with defect identification, code debugging efficiency, and application program reliability.

Figure 3:
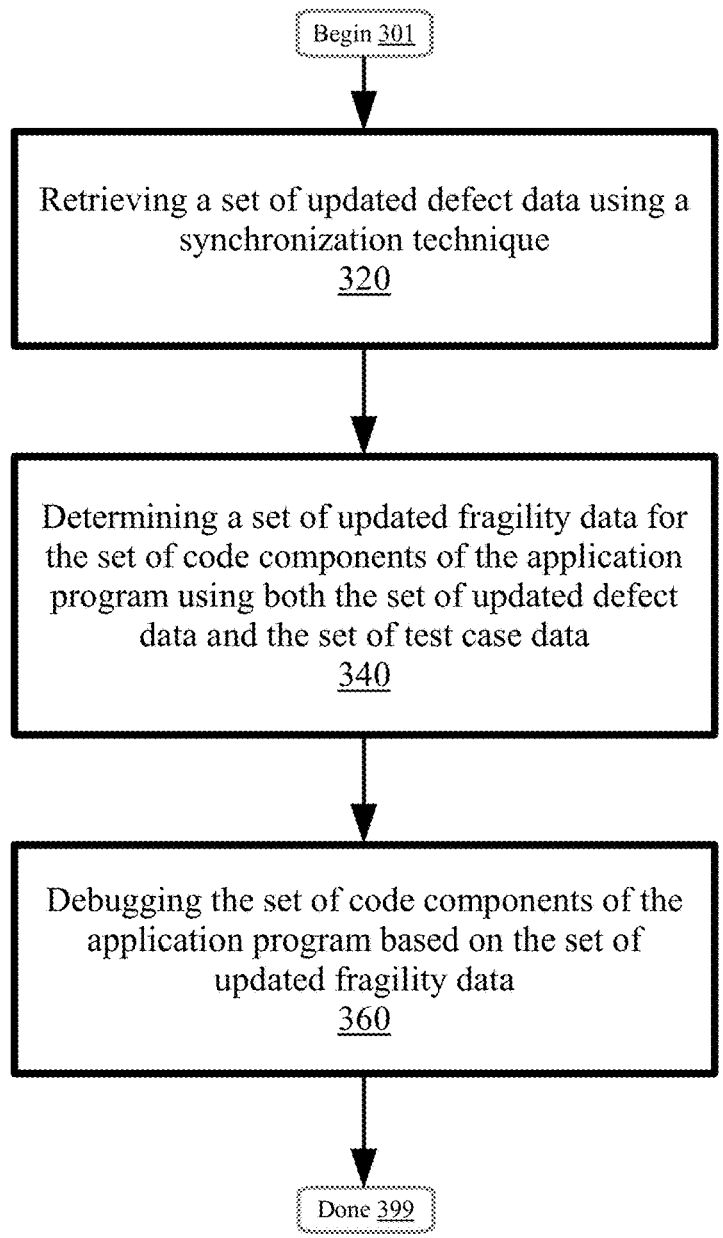
FIG. 3 is a flowchart illustrating a method for debugging a set of code components of an application program, according to embodiments.

FIG. 3 is a flowchart illustrating a method 300 for debugging a set of code components of an application program. Aspects of FIG. 3 relate to periodically synchronizing with application-store review updates to re-compute fragility data for a set of code components. Aspects of the disclosure relate to the recognition that, as new application-store reviews for an application program become available (e.g., are posted), it may be desirable to revise the fragility data for the code components of the application program to reflect the updated user reviews. Accordingly, aspects of the disclosure relate to periodically receiving updated defect data (e.g., corresponding to a set of code components), determining updated fragility data based on the updated defect data, and debugging the set of code components based on the set of updated fragility data. The method 300 may begin at block 301.

In embodiments, a set of updated defect data may be retrieved at block 320. The set of updated defect data may be retrieved using a synchronization technique. Generally, retrieving can include acquiring, gathering, fetching, aggregating, or accumulating the set of updated defect data. The set of updated defect data may include information that indicates errors, bugs, glitches, or other irregularities of the application program. The set of updated defect data may include information that has been revised or modified with respect to the set of defect data, or information that was not included in the original set of defect data. In embodiments, retrieving the set of updated defect data may include using a synchronization technique. The synchronization technique may include a parameter, triggering condition, or threshold configured such that when achieved, retrieval of the set of updated defect data may be initiated. As examples, the synchronization technique may include a temporal period (e.g., retrieve every 30 minutes, 1 hour, 2 days), an ongoing collection protocol (e.g., new data is collected as soon as it becomes available), a code modification (e.g., retrieve data in response to/subsequent to changes to one or more code components), a threshold data increase (e.g., user reviews above a threshold number, text characters above a threshold amount), or the like. For instance, retrieving the set of updated defect data may include monitoring the application store, and importing new user reviews for an application program once each day. Other methods of retrieving the set of updated defect data using the synchronization technique are also possible.

In embodiments, a set of updated fragility data for the set of code components of the application program may be determined using both the set of updated defect data and the set of test case data at block 340. Generally, determining can include computing, calculating, formulating, generating, or otherwise ascertaining the set of updated fragility data. In embodiments, the set of updated fragility data may include a modified or revised indication of the sensitivity, proclivity to malfunction, or error frequency of the set of code components. In embodiments, determining the set of updated fragility data may include evaluating the set of updated defect data, and identifying a set of test case data (e.g., additional/new test cases) that correspond to the defects indicated by the set of updated defect data. Using the set of updated defect data and the set of test case data, the set of updated fragility data may be computed to provide a revised (e.g., up-to-date) indication of the fragility of the set of code components. As an example, in response to retrieving a set of updated defect data that indicates a recent code update has resulted in a multitude of new errors with respect to the "Settings" screen of an application program, a set of updated fragility data may be determined that indicates "high fragility" with respect to the code components corresponding to the "Settings" screen. Other methods of determining the set of updated fragility data are also possible.

In embodiments, the set of code components of the application program may be debugged based on the set of updated fragility data at block 360. Generally, debugging can include troubleshooting, adjusting, repairing, fixing, revising, or otherwise removing errors from the set of code components. In embodiments, debugging may include using the set of updated fragility data to identify a new subset of code components associated with errors or defects, and initiating a code diagnostic tool to locate and resolve the defects of the identified code components. For instance, the set of updated fragility data may be used to identify code components associated with fragility degree-extents that achieve a threshold, or changed by a threshold degree (e.g., with respect to the original set of fragility data) for prioritized debugging. In embodiments, debugging may include analyzing a set of error messages indicated by the set of fragility data, and ascertaining particular lines or portions of code that may be the cause of the defect. The ascertained locations may then be parsed for uninitialized variables, invalid functions or other potential errors, and resolved. Other methods of debugging the set of code components based on the set of updated fragility data are also possible. The method 300 may end at block 399.

Figure 4:
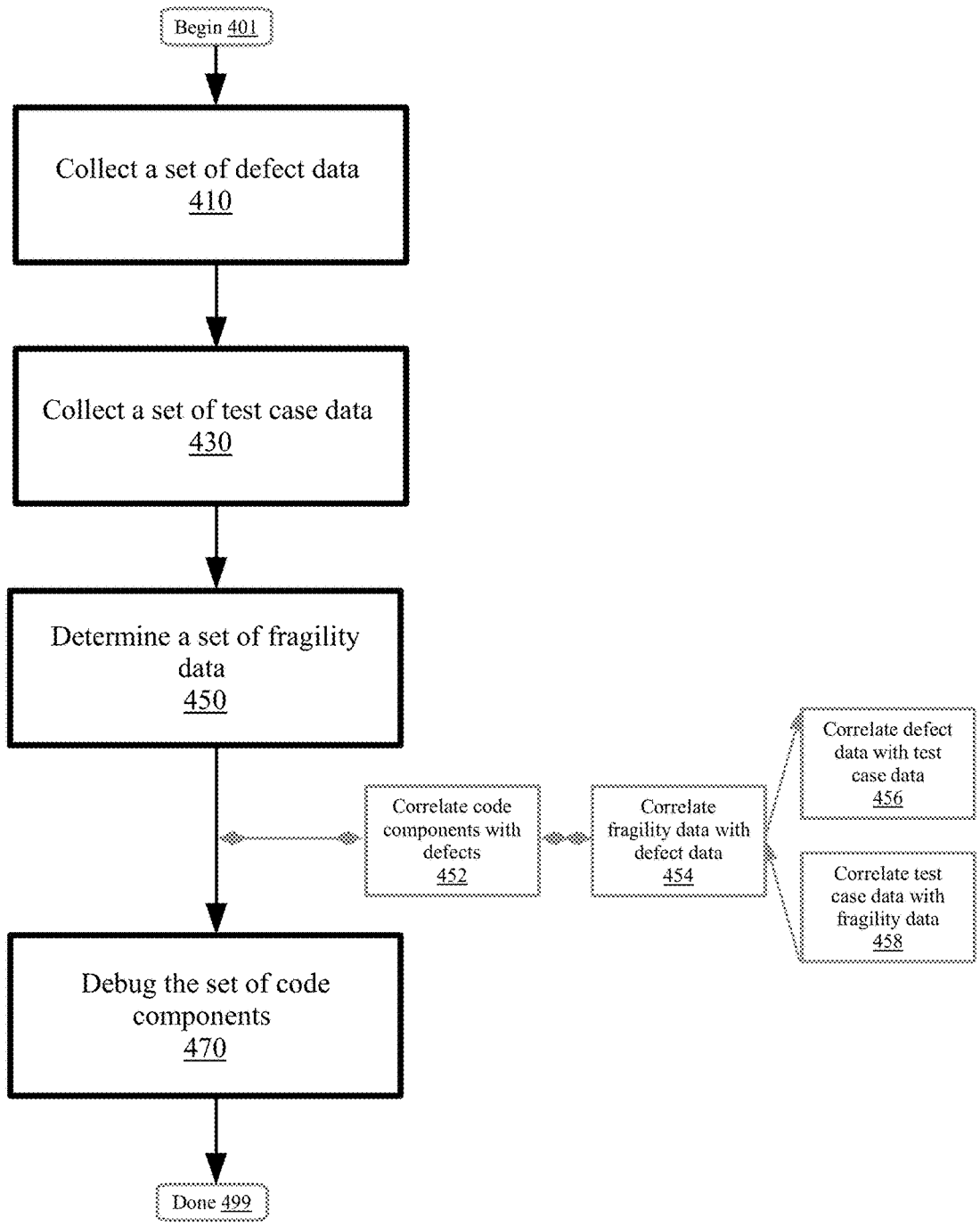
FIG. 4 is a flowchart illustrating a method for debugging a set of code components of an application program, according to embodiments.

FIG. 4 is a flowchart illustrating a method 400 for debugging a set of code components of an application program. Aspects of FIG. 4 relate to correlating a set of code components with a set of defects using a set of test cases. Aspects of the disclosure relate to the recognition that, in some situations, application program defects indicated by application store reviews may not designate the specific code component associated with the defect (e.g., users of the application may not be familiar with the underlying code structure of applications). Accordingly, aspects of the disclosure relate to using test cases (e.g., based on development tests of the application program) to facilitate mapping of defect data with a set of code components (e.g., for debugging). In embodiments, aspects of method 400 may substantially correspond to embodiments described herein and illustrated in the FIGS. 1-9. At block 410, a set of defect data may be collected. At block 430, a set of test case data may be collected. At block 450, a set of fragility data may be collected. At block 470, the set of code components may be debugged. The method may begin at block 401.

In embodiments, the set of code components may be correlated with the set of defects at block 452. A respective code component may correlate with a respective defect. Generally, correlating can include mapping, linking, connecting, coupling, coordinating, or otherwise associating the set of code components with the set of defects. Aspects of the disclosure relate to the recognition that, in some situations, a defect indicated by the set of defect data may be related to (e.g., the result of) an error in a code component of the application program. Accordingly, aspects of the disclosure relate to correlating one or more defects of the set of defect data with a respective code component. In embodiments, correlating the set of code components with the set of defects may include mapping each defect indicated by the set of defect data to a particular code component of the set of code components. For instance, defects may be mapped to code components that are associated with a high likelihood of being the cause of the defect. As an example, for a defect of "Application fails to start up," a code component of "Application Initiation Protocol" may be identified and mapped to the defect. Other methods of correlating the set of code components with the set of defects are also possible.

In embodiments, the set of fragility data may be correlated with the set of defect data at block 454. A respective subset of the set of fragility data may correlate with a respective subset of the set of defect data, where the respective subset of the set of fragility data corresponds with the respective code component and the respective subset of the set of defect data corresponds with the respective defect. Generally, correlating can include mapping, linking, connecting, coupling, coordinating, or otherwise associating the set of fragility data with the set of defect data. As described herein, aspects of the disclosure relate to the recognition that characteristics, properties, or attributes of the set of defect data (e.g., collected from application-store user reviews) may indicate the fragility of one or more code components. Accordingly, aspects of the disclosure relate to correlating a subset of the set of defect data with a respective subset of the set of fragility data. In embodiments, correlating may include linking a portion of the defect data that describes a particular bug or error with a portion of fragility data for a code component that may be associated with the bug or error (e.g., code component configured to provide/run the feature of the application program that encountered the error). As an example, for a set of defect data that relates to multiple errors in an application program, a subset of the set of defect data pertaining to a particular error (e.g., login username is not accepted even though it is correct) may be linked with a subset of fragility data for a code component (e.g., fragility data indicating high frequency of issues related to a "login component"). Other methods of correlating the set of fragility data with the set of defect data are also possible.

In embodiments, the set of defect data may be correlated with the set of test case data at block 456. A respective subset of the set of test case data may correspond with a respective test case, the respective subset of the set of defect data may correlate with the respective subset of the set of test case data, and the respective defect may correlate with the respective test case. Generally, correlating can include mapping, linking, connecting, coupling, coordinating, or otherwise associating the set of defect data with the set of test case data. As described herein, aspects of the disclosure relate to the recognition that the particular code component associated with a defect in the application program may not be apparent based on the set of defect data alone (e.g., users may not specify the code components or source of defects in reviews). Accordingly, in embodiments, aspects of the disclosure relate to mapping the set of defect data with a set of test case data. The set of test case data may include information regarding archived parameter configurations in which the application was tested during development. For instance, the set of test case data may describe errors or defects that were encountered while the application program was in development, as well as the parameter configurations under which those defects arose. In embodiments, correlating the set of defect data with the set of test case data may include using a natural language processing technique to extract semantic and syntactic information from the set of defect data, and subsequently using the extracted semantic and syntactic information to ascertain a set of test cases that relate to the set of defects (e.g., semantic or syntactic similarity between the set of defect data and the set of test case data). For instance, a subset of defect data that describes a defect of "user inputs not registered" may be analyzed and mapped to a test case that states "User input recognition protocol fails upon repeated page refreshes." Other methods of correlating the set of defect data with the set of test cases are also possible.

In embodiments, the set of test case data may be correlating with the set of fragility data at block 458. The respective subset of the set of test case data may correlate with the respective subset of the set of fragility data, and the respective test case data may correlate with the respective defect. Generally, correlating can include mapping, linking, connecting, coupling, coordinating, or otherwise associating the set of test case data with the set of fragility data. As described herein, aspects of the disclosure relate to the recognition that, using the set of test case data, a connection may be established between the set of defect data and the set of fragility data for a code component. In embodiments, correlating the set of test case data with the set of fragility data may include ascertaining a code component referenced by the set of test case data, and identifying a set of fragility data coupled with the ascertained code component. As an example, a set of test case data that indicates that a defect arose in development with respect to a code component of a "Data Submission Protocol" may be mapped with a set of fragility data for the Data Submission Protocol code component. In this way, defects indicated by the set of defect data may be correlated to code components using the set of test case data. Other methods of correlating the set of test case data with the set of fragility data are also possible. The method 400 may end at block 499.

Figure 5:
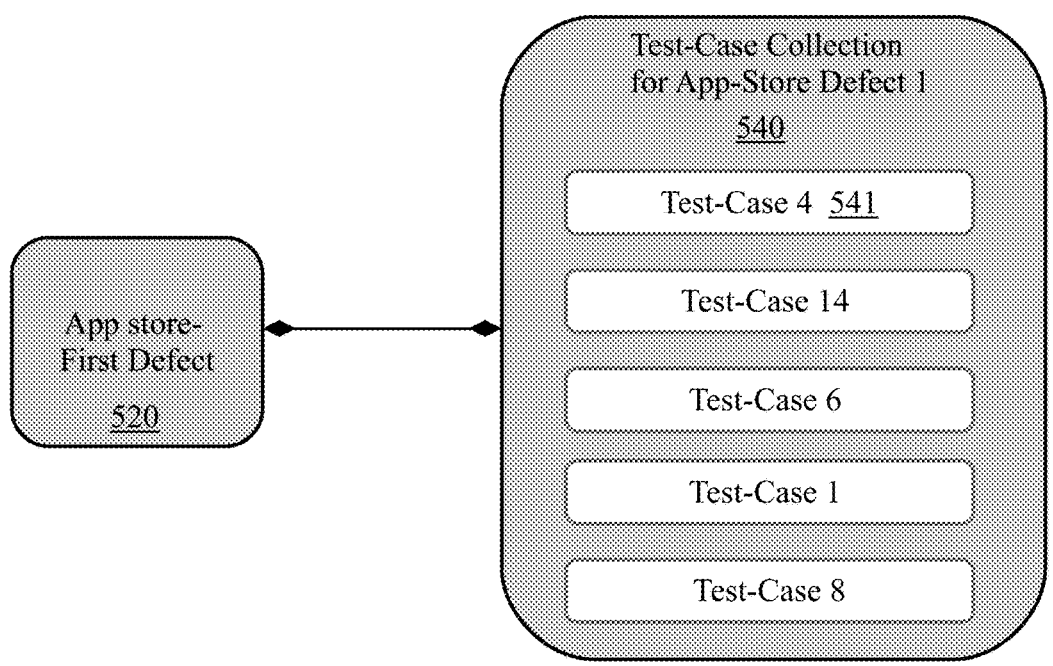
FIG. 5 is a diagram illustrating a correlation between a set of defect data and a set of test case data, according to embodiments.

FIG. 5 is a diagram illustrating a correlation 500 between a set of defect data and a set of test case data, according to embodiments. Aspects of FIG. 5 relate to identifying a test case collection 540 corresponding to a first defect 520 indicated by application-store reviews for an application program. As described herein, users (e.g., non-developer users) may post reviews for an application program on an application-store that distributes the application program. In embodiments, the reviews may describe errors, glitches, or other defects that users have encountered while using the application program. For instance, a user may post a review describing a first defect 520 in which a weather forecast application does not display up-to-date weather information. Based on the first defect 520 described in the user review, a test case collection 540 may be identified. The test case collection 540 may include a set of test cases that describe development test environments in which defects or errors similar to the first defect 520 arose. For instance, the test case collection may include a Test-Case 4 541 that describes an error in which the weather forecast application did not refresh when the location registered for a user in a user profile did not match the current location of the user (e.g., as detected by global positioning techniques). Other types of correlations between the set of defect data and the set of test case data are also possible.

Figure 6:
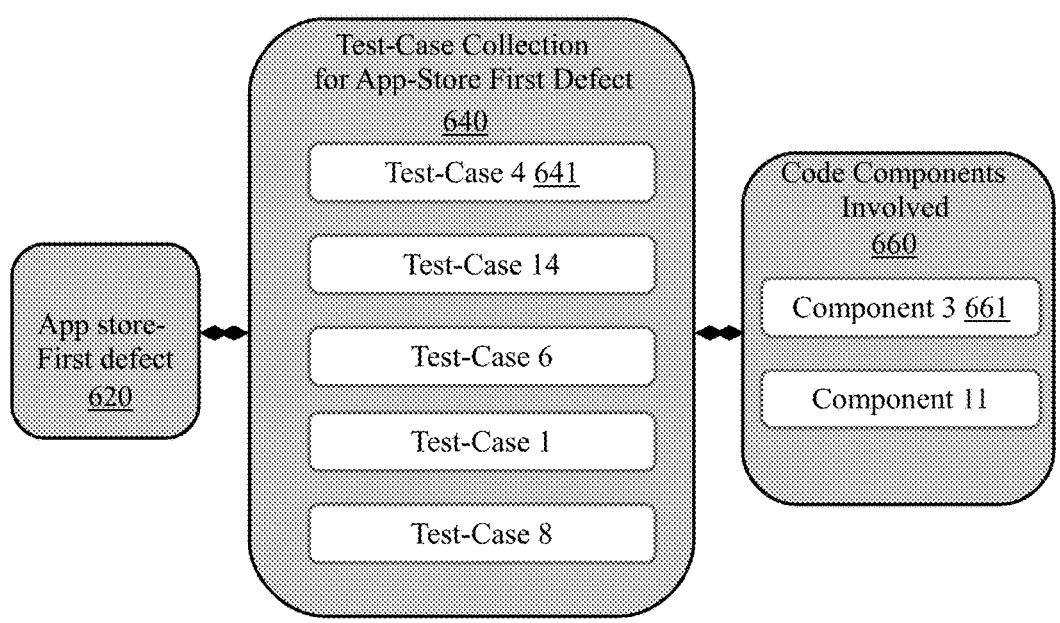
FIG. 6 is a diagram illustrating a correlation between a set of defect data and a set of code components using a set of test case data, according to embodiments.

FIG. 6 is a diagram illustrating a correlation 600 between a set of defect data and a set of code components using a set of test case data, according to embodiments. Aspects of FIG. 6 relate to mapping a first defect 620 to a set of code components 660 based on a test-case collection 640. As described herein, a test case collection 640 may be identified based on a first defect 620 described in an application-store review (e.g., set of defect data). Aspects of the disclosure, in embodiments, relate to using the test case collection 640 to determine a set of code components 660 that correspond to the first defect 620. In embodiments, one or more test cases of the test case collection 640 may indicate a particular code component. For instance, the test case may reference a code component that was tested as part of a development software testing process. In certain embodiments, the test cases may include executable program code configured to run code components for testing. Consider the following example. A first defect 620 may relate to a defect of "Music app plays tracks in playlist order even when shuffle is pressed." A test case collection 640 of test cases that relate to the first defect 620 may be identified (e.g., test cases that relate to playlist order, the shuffle feature). In embodiments, a Test-Case 4 641 may be executed, and instrumentation techniques may be used to record which code components are executed during test-case playback. For instance, playback of Test-Case 641 may indicate that a Code Component 3 661 related to "Track Randomization" was invoked Accordingly, Code Component 3 661 may be identified as a possible source of the first defect 620. In this way, a correlation between a set of defect data and a set of code components may be established using a set of test case data. Other types of correlations between the set of defect data and the set of code components are also possible.

Figure 7:
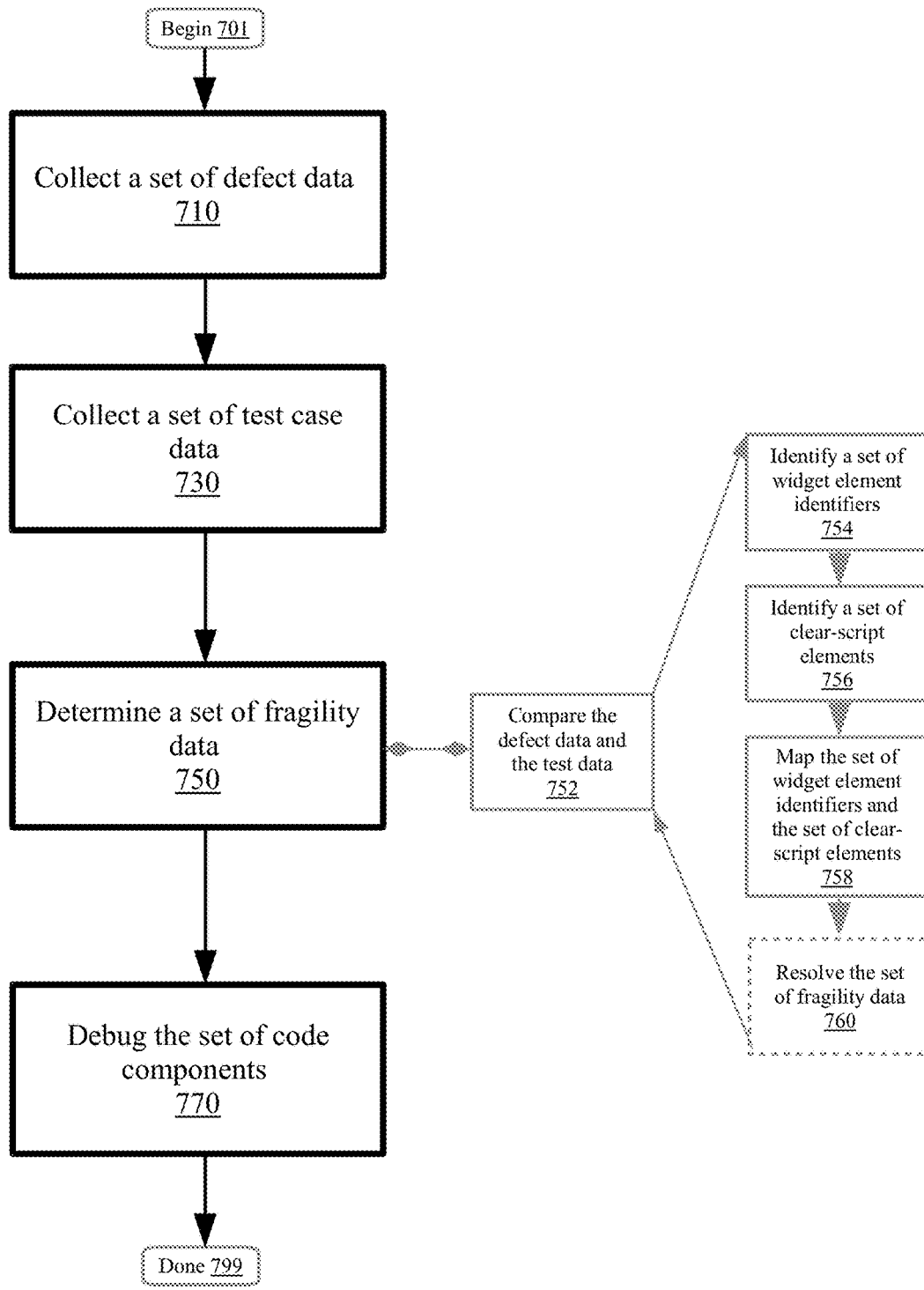
FIG. 7 is a flowchart illustrating a method for debugging a set of code components of an application program, according to embodiments.

FIG. 7 is a flowchart illustrating a method 700 for debugging a set of code components of an application program. Aspects of FIG. 7 relate to resolving a set of fragility data for a set of code components of an application program. As described herein, aspects of the disclosure relate to identifying attributes of a set of defect data (e.g., widget element identifiers) and a set of test case data (e.g., clear-script elements) for use in determining a set of fragility data for the set of code components. In embodiments, aspects of method 700 may substantially correspond to embodiments described herein and illustrated in the FIGS. 1-9. At block 710, a set of defect data may be collected. At block 730, a set of test case data may be collected. At block 750, a set of fragility data may be collected. At block 770, the set of code components may be debugged. The method may begin at block 701.

In embodiments, the set of defect data and the set of test case data may be compared to determine the set of fragility data for the set of code components of the application program at block 752. The set of defect data and the set of test case data may be compared using a semantic analysis technique. The semantic analysis technique may include one or more natural language processing techniques (e.g., topic segmentation and recognition, sentiment analysis, parsing, coreference resolution, context interpretation) configured to derive meaning from natural language content. Generally, comparing can include contrasting, juxtaposing, investigating, assessing, or otherwise examining the set of defect data with respect to the set of test case data. In embodiments, comparing can include utilizing the semantic analysis technique to parse the set of defect data (e.g., user-posted application-store reviews) as well as the set of test case data (e.g., archived, written descriptions of development test configurations), and assessing the semantic similarity between the set of defect data and the set of test case data (e.g., semantic similarity between the set of defect data and the set of test case data achieves a semantic similarity threshold value). The semantic similarity may be evaluated based on the keywords, context, topics, relationships between entities/concepts, and other natural language information for the set of defect data and the set of test case data. As described herein, in response to determining semantic similarity between the set of defect data and the set of test case data, defects of the set of defect data may be correlated with code components indicated by the set of test case data, and the set of fragility data for the set of code components may be computed. Other methods of comparing the set of defect data and the set of test case data to determine the set of fragility data are also possible.

In embodiments, a set of widget element identifiers which indicates the set of defects may be identified at block 754. The set of widget element identifiers may be identified with respect to the set of defect data. Generally, identifying can include recognizing, discovering, distinguishing, detecting, ascertaining, or otherwise determining the set of widget element identifiers. The set of widget element identifiers may include the aspects, features, or components of the application program that are associated with one or more defects, errors, or irregularities. In embodiments, identifying the set of widget element identifiers may include scanning the set of defect data for the names of particular elements or features of the application program (e.g., "Submit button," "Back Arrow," "Drop-down Menu"), and recognizing the named features as the set of widget element identifiers. In embodiments, identifying the set of widget element identifiers may include analyzing screenshots or videos included in the set of defect data with object recognition techniques to extract the aspects or features of the application program that are associated with defects. As an example, identifying may include parsing a screenshot of a web browsing application with an associated caption that says "Page Reload Button does not actually refresh the page," and identifying the "Page Reload Button" as a widget element identifier. Other methods of identifying the set of widget element identifiers are also possible.

In embodiments, a set of clear-script elements which indicates the set of user interface features of the application program may be identified at block 756. The set of clear-script elements may be identified with respect to the set of test case data. Generally, identifying can include recognizing, discovering, distinguishing, detecting, ascertaining, or otherwise determining the set of clear-script elements. The set of clear-script elements may include segments of programming code or portions of the set of test case data that indicate interface features of the application program. As examples, the set of clear-script elements may include code modules that correspond to displaying user profile pictures, buttons, menus, user input interfaces, or other interface features of the application program. In embodiments, identifying the set of clear-script elements may include parsing the code and written descriptions included in the set of test case data, and extracting the code portions that pertain to implementing user-interface features of the application program as the set of clear-script elements. As an example, identifying may include analyzing a comment associated with a portion of code in a particular test case that states "Script for implementing on-screen keyboard," and ascertaining the portion of code as a clear-script element (e.g., corresponding to implementation of an interface-feature of an on-screen keyboard). Other methods of identifying the set of clear-script elements are also possible.

In embodiments, the set of widget element identifiers and the set of clear-script elements may be mapped to determine the set of fragility data for the set of code components of the application program at module 758. Mapping the set of widget element identifiers and the set of clear-script elements may correlate the set of defects and the set of user interface features of the application program. Generally, mapping can include linking, connecting, coupling, coordinating, corresponding, or otherwise associating the set of widget element identifiers and the set of clear-script elements. In embodiments, mapping may include comparing each widget element identifier of the set of widget element identifiers to the set of clear-script elements, and coupling each widget element identifier with the clear-script element(s) that relate to implementation of the interface feature with which the widget element identifier is associated (e.g., the interface feature associated with a defect). As an example, consider a widget element identifier of "search box" (e.g., the search box of an application program is associated with a defect). The widget element identifier of "search box" may be compared to the set of clear-script elements, and mapped to a clear-script element that includes a script configured to implement the search box within the application program. In this way, the set of defects may be correlated with the user interface features (and underlying code elements) with which they are associated. Other methods of mapping the set of widget element identifiers and the set of clear-script elements are also possible.

In embodiments, the set of fragility data for the set of code components of the application program may be resolved using a clustering technique at block 760. The clustering technique may be based on the correlation of the set of defects and the set of user interface features. Generally, resolving can include computing, calculating, formulating, generating, ascertaining, or otherwise determining the set of fragility data using the clustering technique. The clustering technique may include a method or algorithm for performing statistical data analysis with respect to the distribution of defects associated with particular code components. As examples, the clustering technique may include connectivity models (e.g., hierarchical clustering), centroid models (e.g., k-means clustering), distribution models (e.g., multivariate normal distributions), density models (e.g., density-based spatial clustering, ordered point identification), subspace models (e.g., co-clustering, biclustering), and the like. In embodiments, resolving the set of fragility data using the clustering technique may include analyzing the distribution of defects with respect to the set of code components (e.g., as indicated by the widget element identifiers-clear-script elements mapping), and assigning fragility data (e.g., fragility degree extents, fragility nature types) to model the relationship between the set of defects and the set of code components (e.g., indicate which code components are associated with a greater frequency of errors, more severe errors, or the like). Other methods of resolving the set of fragility data using the clustering technique are also possible. The method 700 may end at block 799.

Figure 8:
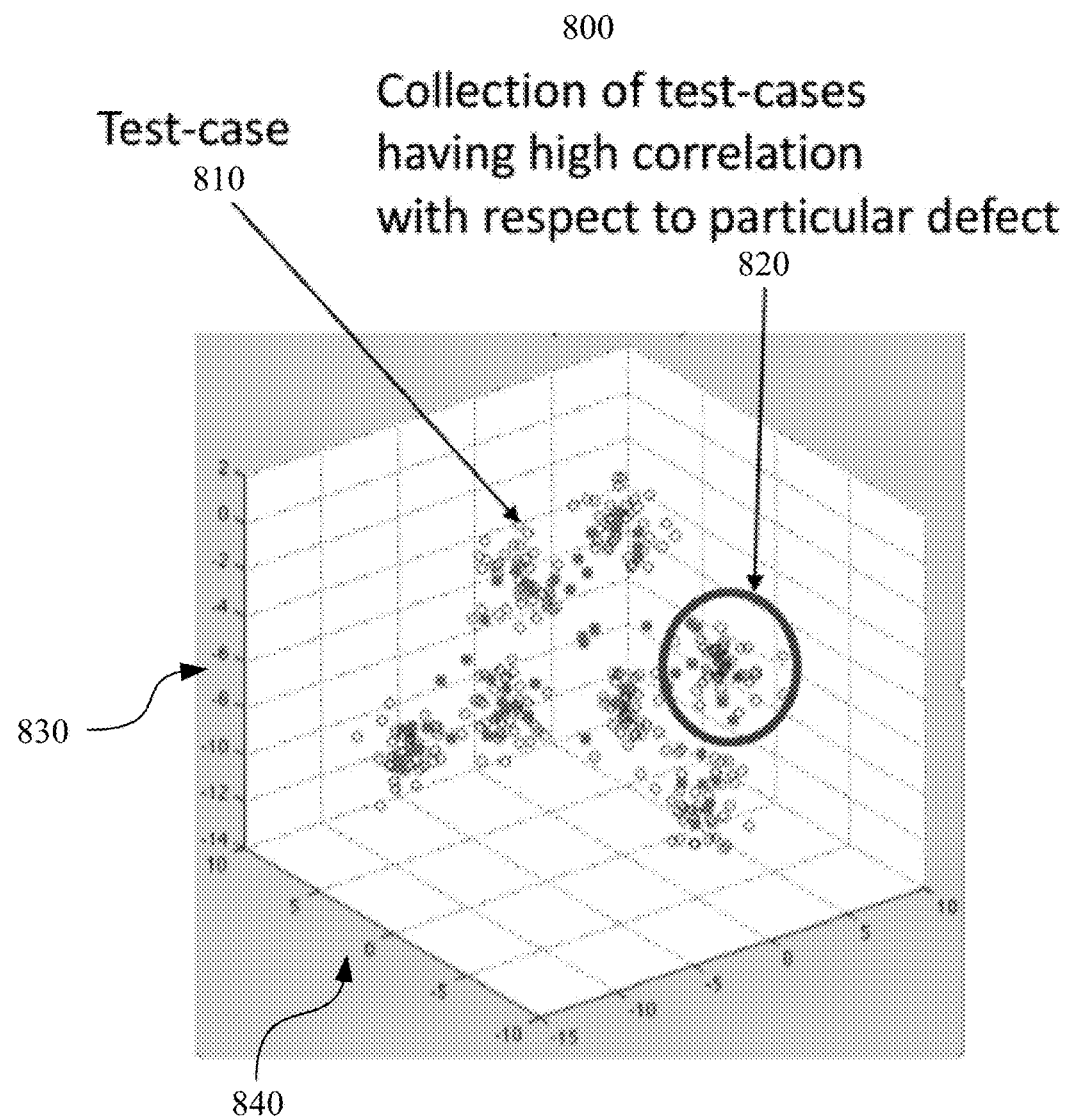
FIG. 8 is a diagram illustrating a defect-code component distribution, according to embodiments.

FIG. 8 is a diagram illustrating a defect-code component distribution 800, according to embodiments. Aspects of FIG. 8 relate to using a clustering technique to resolve a set of fragility data for a set of code components. As described herein, the clustering technique may be used to model the distribution of application program defects (e.g., identified using a set of defect data mined from application-store user reviews) with respect to code components. Based on the distribution of defects with respect to code components, a set of fragility data may be determined for the set of code components (e.g., code components with a greater density of defects may be identified as "fragile"). For instance, in embodiments, a set of widget element identifiers may be graphed on a horizontal axis 840 of the distribution 800, and a set of clear scripts may be graphed on a vertical axis 830. In this way, points on the distribution 800 may represent test cases 810 (e.g., indicated by the set of clear-script elements) and corresponding defects (e.g., indicated by the set of widget element identifiers). Accordingly, clusters such as cluster 820 may indicate a collection of test-cases that have a high correlation with respect to a particular defect. For instance, a first cluster may indicate defects associated with a "log-in interface," a second cluster may indicate defects associated with a "user profile screen," and a third cluster may indicate defects associated with a "data submission button." As described herein, fragility data may be resolved for the set of code components based on the distribution of defects for code components (e.g., clusters with greater density may be assigned greater fragility scores). Other types of clustering techniques are also possible.

Figure 9:
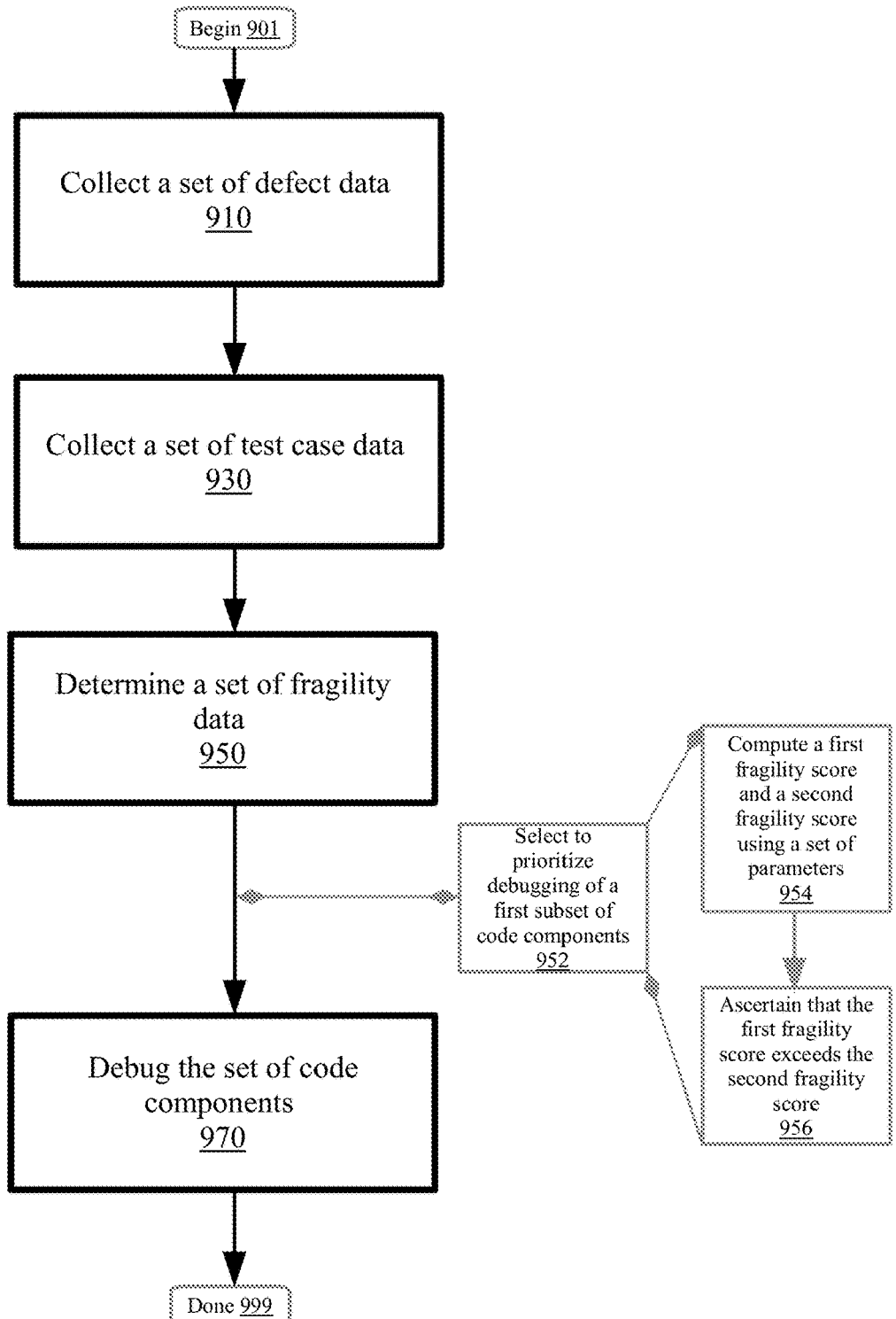
FIG. 9 is a flowchart illustrating a method for debugging a set of code components of an application program, according to embodiments.

FIG. 9 is a flowchart illustrating a method 900 for debugging a set of code components of an application program. Aspects of FIG. 9 relate to prioritizing debugging of particular subsets of code components based on fragility scores. As described herein, aspects of the disclosure relate to the recognition that, in some situations, it may be desirable to prioritize debugging of code components that are considered to be more fragile (e.g., error prone). Accordingly, aspects of the disclosure relate to computing fragility scores for respective code components, and prioritizing debugging of one or more code components that are associated with higher fragility scores. In embodiments, aspects of method 900 may substantially correspond to embodiments described herein and illustrated in the FIGS. 1-9. At block 910, a set of defect data may be collected. At block 930, a set of test case data may be collected. At block 950, a set of fragility data may be collected. At block 970, the set of code components may be debugged. The method may begin at block 901.

In embodiments, it may be selected to prioritize debugging of a first subset of the set of code components of the application program with respect to a second subset of the set of code components of the application program based on the set of fragility data at block 952. The first subset of the set of code components may be associated with a first subset of the set of fragility data, and the second subset of the set of code components may be associated with a second subset of the set of fragility data. Generally, selecting can include choosing, electing, ascertaining, resolving, or determining to prioritize debugging of the first subset of the set of code components. In embodiments, selecting to prioritize debugging of a subset of the set of code components may include assigning an order number to one or more code components to define a sequence for debugging the set of code components (e.g., first subset of the code components will be debugged first, a third subset will be debugged second, a second subset will be debugged third). In embodiments, selecting to prioritize debugging of a subset of the set of code components may include assigning additional resources for use in debugging the subset. As examples, memory resources or processing resources may be allocated for use by a debugger with respect to debugging a particular subset of code components. In certain situations, selecting to prioritize debugging may include requesting a number of debuggers (e.g., additional human workers for debugging), a particular debugging methodology, or an amount of hours (e.g., work-hours) for debugging the subset of the set of code components. Other methods of prioritizing debugging a particular subset of the set of code components are also possible.

In embodiments, a first fragility score may be calculated for a first subset of the set of code components and a second fragility score may be calculated for a second subset of the set of code components at block 954. The first and second fragility scores may be calculated using a set of parameters having values which relate to respective subsets of the set of code components of the application program. Generally, computing can include calculating, estimating, deriving, formulating, or otherwise ascertaining the first fragility score for the first subset of the set of code components and the second fragility score for the second subset of the set of code components. The fragility scores may include quantitative indications of the degree of fragility (e.g., sensitivity, proclivity to malfunction, error frequency) of one or more code components. As an example, the fragility scores may be expressed as integers between 0 and 100, where greater values indicate relatively higher degrees of fragility. In embodiments, computing the fragility scores may include analyzing the relationships between one or more defects and respective code components, and generating the fragility scores based on the frequency of defects with respect to a particular code component, severity of defects with respect to the code component, the priority (e.g., importance, relevance) of the code component with respect to the application program as a whole, or other parameters that define the relationship between the defect and the code component. As an example, a first subset of the set of code components may be associated with a critical error (e.g., such that the application program will not function). Based on the severity of the defect, a first fragility score of 94 may be computed for the first subset of the set of code components. As another example, a second subset of the set of code components may be associated with a display malfunction error (e.g., a user interface element does not display correctly, although proper functionality is maintained). In embodiments, a second fragility score of 51 may be computed for the second subset of the set of code components (e.g., the nature of the defect is less severe than the critical error of the first subset). Other methods of computing the first and second fragility scores are also possible.

In embodiments, it may be ascertained that the first fragility score exceeds the second fragility score at block 956. Ascertaining that the first fragility score exceeds the second fragility score may be performed by comparing the first and second fragility scores. Generally, ascertaining can include discovering, detecting, confirming, verifying, or otherwise determining that the first fragility score exceeds (e.g., is greater than) the second fragility score. In embodiments, ascertaining may include contrasting the magnitude of the first fragility score and the second fragility score, and detecting that the first fragility score is greater than the second fragility score. As an example, in response to comparing a first fragility score of 86 and a second fragility score of 41, it may be determined that the first fragility score exceeds the second fragility score. As described herein, based on the relation between the first fragility score and the second fragility score, debugging of one or more code components may be prioritized. Other methods of ascertaining that the first fragility score exceeds the second fragility score are also possible.

As described herein, computation of the first and second fragility scores may be based on a set of parameters having sets of values which relate to particular subsets of the set of code components. In embodiments, the set of parameters may include a defect correlation factor. The defect correlation factor may include a measure of how closely (e.g., accurately, precisely) the nature of a particular defect corresponds with a code component. For example, a defect of "application crashes on start-up" may be associated with a high defect correlation factor with respect to a code component configured to allocate memory for application initialization, but a relatively low defect correlation factor with respect to a code component configured to display a logoff screen. In embodiments, the set of parameters may include a test-case correlation factor. The test-case correlation factor may include a measure of how closely the nature of a test-case corresponds with a code component or a defect. For instance, a test-case that calls a "data submission protocol" upon execution may be associated with a high test-case correlation factor with respect to a defect pertaining to "Profile Data Submission Failure," but a low test-case correlation factor with respect to a defect pertaining to "application will not import pictures from camera."

In embodiments, the set of parameters may include a defect criticality factor. The defect criticality factor may include a measure of how serious, severe, or urgent a particular defect is. For example, a defect of "application freezes device upon initiation" may be associated with a high defect criticality factor, while a defect of "sad face emoticon does not display correctly" may be associated with a low defect criticality factor. In embodiments, the set of parameters may include a cluster density factor. The cluster density factor may include a measure of the total number or frequency of defects associated with a particular code component. For instance, a code component that is associated with 40 defects in a two-hour time period may considered to have a high cluster density factor, while a code component that has 2 defects over a 1 year period may be considered to have a low cluster density factor. In embodiments, the set of parameters may include a cluster correlation factor. The cluster correlation factor may include a measure of how closely a cluster of defects and code components relate to other defect-code component clusters. For instance, clusters that have similar defect occurrence frequencies, defect severities, or other attributes may be considered to have high cluster correlation factors (e.g., and may be assigned similar fragility scores).

In embodiments, the set of parameter values may include a code component complexity factor. The code component complexity factor may include a measure of how elaborate, complicated, or intricate a particular code component is. For instance, code components that include a number of lines, variables, functions, loops, if-then statements, or parameters above a threshold value may be considered to have a high code component complexity factors. In embodiments, the set of parameter values may include a code interdependency factor. The code interdependency factor may include a measure of how dependent (e.g., reliant, contingent) a particular code component is on external elements. For example, a particular code component that invokes a number of modules or scripts that are external to the code component may be considered to have a high code interdependency factor. As described herein, one or more of the set of parameters may be used to facilitate computation of the set of fragility scores. Other types of parameters are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for debugging a set of code components of an application program, the method comprising:
    collecting, with respect to the application program, a set of defect data which indicates a set of defects, wherein the set of defect data is derived from a set of post-compilation users of the application program;
    collecting, with respect to the application program, a set of test case data which indicates a set of user interface features of the application program, wherein the set of test case data is derived from a set of development tests of the application program;
    determining, using both the set of defect data and the set of test case data, a set of fragility data for the set of code components of the application program; and
    debugging, based on the set of fragility data for the set of code components of the application program, the set of code components of the application program.

2. The method of claim 1, further comprising:
    retrieving, using a synchronization criterion, a set of updated defect data;
    determining, using both the set of updated defect data and the set of test case data, a set of updated fragility data for the set of code components of the application program; and
    debugging, based on the set of updated fragility data for the set of code components of the application program, the set of code components of the application program.

3. The method of claim 1, further comprising:
    correlating the set of code components with the set of defects, wherein a respective code component correlates with a respective defect.

4. The method of claim 3, further comprising:
    correlating the set of fragility data with the set of defect data, wherein a respective subset of the set of fragility data correlates with a respective subset of the set of defect data, wherein the respective subset of the set of fragility data corresponds with the respective code component, and wherein the respective subset of the set of defect data corresponds with the respective defect.

5. The method of claim 4, further comprising:
correlating the set of defect data with the set of test case data, wherein a respective subset of the set of test case data corresponds with a respective test case, wherein the respective subset of the set of defect data correlates with the respective subset of the set of test case data, and wherein the respective defect correlates with the respective test case; and
correlating the set of test case data with the set of fragility data, wherein the respective subset of the set of test case data correlates with the respective subset of the set of fragility data, and wherein the respective test case correlates with the respective defect.

6. The method of claim 1, further comprising:
indicating, by the set of fragility data, a set of fragility degree-extents for the set of code components of the application program, wherein a respective subset of the set of fragility data indicates a respective fragility degree-extent for a respective code component of the set of code components of the application program.

7. The method of claim 1, further comprising:
indicating, by the set of fragility data, a set of fragility nature-types for the set of code components of the application program, wherein a respective subset of the set of fragility data indicates a respective fragility nature-type for a respective code component of the set of code components of the application program.

8. The method of claim 1, further comprising:
comparing, using a semantic analysis technique, the set of defect data and the set of test case data to determine the set of fragility data for the set of code components of the application program.

9. The method of claim 8, further comprising:
identifying, with respect to the set of defect data, a set of widget element identifiers which indicates the set of defects;
identifying, with respect to the set of test case data, a set of clear-script elements which indicates the set of user interface features of the application program;
mapping, to correlate the set of defects and the set of user interface features of the application program, the set of widget element identifiers and the set of clear-script elements to determine the set of fragility data for the set of code components of the application program.

10. The method of claim 9, further comprising:
resolving, using a clustering technique based on the mapping, the set of fragility data for the set of code components of the application program, wherein a respective widget element identifier of the set of widget element identifiers maps with a respective clear-script element of the set of clear-script elements.

11. The method of claim 1, further comprising:
selecting, based on the set of fragility data for the set of code components of the application program, to prioritize debug of a first subset of the set of code components of the application program with respect to a second subset of the set of code components of the application program, wherein the first subset of the set of code components is associated with a first subset of the set of fragility data, and wherein the second subset of the set of code components is associated with a second subset of the set of fragility data; and
debugging, with priority with respect to the second subset of the set of code components of the application program, the first subset of the set of code components of the application program.

12. The method of claim 11, further comprising:
computing, using a set of parameters having a first set of values which relates to the first subset of the set of code components of the application program, a first fragility score for the first subset of the set of code components of the application program;
computing, using the set of parameters having a second set of values which relates to the second subset of the set of code components of the application program, a second fragility score for the second subset of the set of code components of the application program; and
ascertaining, by comparing the first and second fragility scores, that the first fragility score exceeds the second fragility score.

13. The method of claim 12, wherein the set of parameters is selected from the group consisting of:
a defect correlation factor,
a test-case correlation factor,
a defect criticality factor,
a cluster density factor,
a cluster correlation factor,
a code component complexity factor, and
a code interdependency factor.

14. The method of claim 1, wherein debugging, based on the set of fragility data for the set of code components of the application program, the set of code components of the application program includes:
establishing, in an automated fashion based on the set of fragility data for the set of code components of the application program, a breakpoint linked with the set of code components of the application program;
presenting, in response to triggering the breakpoint, the set of code components of the application program linked with the breakpoint; and
modifying the set of code components of the application program.

15. The method of claim 1, wherein the collecting of the set of defect data, the collecting of the set of test case data, and the determining each occur in a dynamic fashion to streamline debugging.

16. The method of claim 1, wherein the collecting of the set of defect data, the collecting of the set of test case data, and the determining each occur in an automated fashion without user intervention.

* * * * *